United States Patent [19]

Narayan et al.

[11] 3,882,118
[45] May 6, 1975

[54] PROCESS FOR THE PREPARATION OF UNSYMMETRICALLY-SUBSTITUTED ALKANOLAMINO-S-TRIAZINES

[75] Inventors: Thirumurti L. Narayan, Riverview; Moses Cenker, Trenton, both of Mich.

[73] Assignee: BASF Wyandotte Corporation, Wyandotte, Mich.

[22] Filed: Dec. 29, 1972

[21] Appl. No.: 319,931

[52] U.S. Cl. ........ 260/249.6; 260/249.5; 260/249.8
[51] Int. Cl. ............................................. C07d 55/22
[58] Field of Search............ 260/249.5, 249.6, 249.8

[56] References Cited
UNITED STATES PATENTS

| | | | |
|---|---|---|---|
| 3,410,855 | 11/1968 | Varsanyi et al................. | 260/249.6 |
| 3,479,353 | 11/1969 | Petzold et al................... | 260/249.6 |
| 3,573,301 | 3/1971 | Winter............................ | 260/249.6 |

OTHER PUBLICATIONS

Kaiser et al., J. Am. Chem. Soc., Vol. 73, pp. 2984–2986, (1951), QD 1.a5.

*Primary Examiner*—John M. Ford
*Attorney, Agent, or Firm*—Joseph D. Michaels; Bernhard R. Swick; Robert E. Dunn

[57] ABSTRACT

Unsymmetrically-substituted alkanolamino-s-triazines are prepared in excellent yields by the reaction of cyanuric chloride with a reactive hydrogen-containing compound and an alkanolamine in the presence of an acid acceptor. The resulting triazines are effective catalysts for the preparation of rigid cellular foams.

10 Claims, No Drawings

PROCESS FOR THE PREPARATION OF UNSYMMETRICALLY-SUBSTITUTED ALKANOLAMINO-S-TRIAZINES

BACKGROUND OF THE INVENTION

1. Field Of The Invention

The present invention relates to a process for the preparation of unsymmetrically-substituted s-triazine compounds. More particularly, the invention relates to a process for the preparation of unsymmetrically-substituted s-triazine compounds in excellent yields without separation of the chloro-substituted intermediates.

2. Prior Art

The synthesis of unsymmetrically-substituted s-triazines from cyanuric chloride is known. For example, D. W. Kaiser et al, J. Am. Chem. Soc., 73, 2981–2983 (1951) have reported the synthesis of several unsymmetrically-substituted s-triazines. Generally, Kaiser et al have carried out the preparation of the aforementioned compounds in two steps. The first step involved the replacement of one or two chlorine atoms of cyanuric chloride with an appropriate amine or alcohol, and isolation and purification of the resulting substituted chlorotriazine. In the second step, the purified chlorotriazine was reacted with a different amine or alcohol to obtain the fully unsymmetrically-substituted triazine. Specifically, in order to prepare 2,4-diamino-6-diethylamino-s-triazine, cyanuric chloride was reacted with ammonia to obtain the 2-chloro-4,6-diamino-s-triazine in the first step. The chlorotriazine was isolated, purified and reacted with diethylamine to replace the third chlorine. Similarly, the two-step method was extensively used by J. R. Dudley et al, J. Am. Chem. Soc., 73, 2986–2990 (1951) to prepare alkoxyaminotriazines, and by F. C. Schaefer et al, ibid 73, 2990–2992 (1951) to obtain aminophenoxytriazines. A recent patent (U.S. 3,573,301) granted to Geigy Chemical Corporation also discloses the two-step method for the preparation of some unsymmetrically-substituted alkanolamino triazines.

The above-discussed methods of preparation suffer because they involve a number of reaction steps and generally produce low yields. Furthermore, some methods require extensive purifications before material of acceptable quality is obtained.

SUMMARY OF THE INVENTION

In accordance with the present invention, unsymmetrically-substituted s-triazine compounds of the formula:

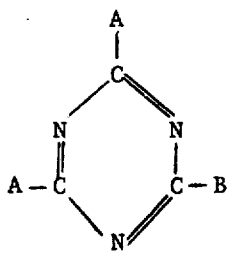

wherein
B is v,    $N\begin{smallmatrix}CR_2CR_2OH\\R'\end{smallmatrix}$ ,

R is hydrogen or lower alkyl,
R' is $CR_2CR_2OH$ or lower alkyl and

A is $NR_2$,

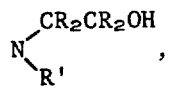

alkoxy, aryloxy, aziridyl, pyrrolidyl, piperidyl, or N-alkylpiperazyl with the proviso that both A's cannot be B, are prepared by the sequential reaction of cyanuric chloride with a reactive hydrogen-containing compound and an alkanolamine in the presence of an acid acceptor. According to the process of the present invention, unsymmetrically-substituted s-triazines are prepared without the isolation and purification of intermediates. The process of the subject invention results in exceptionally high yields of product.

DESCRIPTION OF THE PREFERRED EMBODIMENT

The present invention provides a new process for the preparation of unsymmetrically-substituted s-triazines by the sequential reaction of cyanuric chloride with a reactive hydrogen-containing compound and an alkanolamine in the presence of an acid acceptor. The triazines which may be prepared in accordance with the process of the subject invention correspond to the following formula:

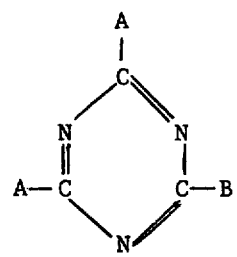

wherein
B is

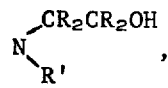

R is hydrogen or lower alkyl,
R' is $CR_2CR_2OH$ or lower alkyl and A is $NR_2$,

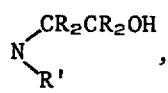

alkoxy, aryloxy, aziridyl, pyrrolidyl, piperidyl, or N-alkylpiperazyl with the proviso that both A's cannot be B.

As mentioned above, there are three essential reactants employed in the subject invention, namely, cyanuric chloride, a reactive hydrogen-containing compound and an alkanolamine. The mole ratio of cyanuric chloride to reactive hydrogen-containing compound to alkanolamine may vary from 1:1:2 to 1:2:1, respectively.

Reactive hydrogen-containing compounds which may be employed in the present invention correspond to the formula A-H wherein A is as described above. Representative compounds include ammonia; aliphatic primary and secondary amines having from 1 to 12 carbon atoms such as methylamine, dimethylamine, ethylamine, diethylamine, propylamine, dipropylamine, diisopropylamine, dibutylamine, diamylamine, hexylamine, 2-ethylhexylamine, N-methylbutylamine, N- ethylbutylamine, dodecylamine and decylamine; alkanolamines having from 1 to 12 carbon atoms such as N-methylethanolamine, N-ethylethanolamine, ethanolamine and diethanolamine, isopropanolamine, diisopropanolamine, t-butanolamine, di-t-butanolamine, dihexanolamine, dodecanolamine and didodecanolamine; aliphatic alcohols having from 1 to 12 carbon atoms such as methanol, ethanol, isopropanol, t-butanol, pentanol, hexanol, decanol, dodecanol, allyl alcohol; phenol and substituted phenols such as chlorophenol, pentachlorophenol, nitrophenol, allylphenol, 2-allyl-6-methylphenol, 4-n-butoxyphenol and 3,5-dimethoxyphenol; secondary cyclic amines such as aziridine; pyrrolidine and piperidine. In addition, compounds which do not necessarily fit into any of the above classes but have reactive hydrogen atoms such as 2-hydroxyethyl methacrylate may be employed. Generally, from one to two moles of reactive hydrogen compound per mole of cyanuric chloride will be employed in the present invention.

The third reactant in the process of the subject invention is an alkanolamine. Representative alkanolamines which may be employed in the present invention correspond to the formula:

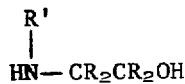

wherein R and R' are as defined above. It is to be understood that in order to obtain unsymmetrically-substituted s-triazines in accordance with the process of the present invention the alkanolamine cannot be the same alkanolamine which may be employed as the reactive hydrogen-containing reactant. Generally, from one to two moles of alkanolamine per mole of cyanuric chloride will be employed in the present invention.

Illustrative examples of the compounds which may be prepared by the process of the invention include:

2-amino-4,6-bis(N-methylethanolamino)-s-triazine
2-amino-4,6-bis(diethanolamino)-s-triazine
2,4-bis(N-methylethanolamino)-6-dimethylamino-s-triazine
2,4-bis(diethylamino)-6-(N-methylethanolamino)-s-triazine
2,4-bis(N-methylanilino)-6-(N-methylethanolamino)-s-triazine
2,4-diphenoxy-6-(N-methylethanolamino)-s-triazine
2,4-bis(N-methyl-3-vinylanilino)-6-(N-methylethanolamino)-s-triazine
2,4-di(6-chlorophenoxy)-6-(N-methylethanolamino)-s-triazine
2,4-di(pentachlorophenoxy)-6-(N-methylethanolamino)-s-triazine
2,4-di(6-nitrophenoxy)-6-(N-methylethanolamino)-s-triazine
2,4-di(2-allylphenoxy)-6-(N-methylethanolamino)-s-triazine
2,4-di(2-allyl-6-methylphenoxy)-6-(N-methylethanolamino)-s-triazine
2,4-di(4-n-butoxyphenoxy)-6-(N-methylethanolamino)-s-triazine
2,4-di(3,5-dimethoxyphenoxy)-6-(N-methylethanolamino)-s-triazine
2,4-bis(N-methylethanolamino)-6-phenoxy-s-triazine
2,4-bis(diethanolamino)-6-(4-chlorophenoxy)-s-triazine
2,4-bis(diethanolamino)-6-pentachlorophenoxy-s-triazine
2,4-(diethoxy)-6-(N-methylethanolamino)-s-triazine
2,4-(dimethoxy)-6-(N-methylethanolamino)-s-triazine
2,4-(diethoxy)-6-diethanolamino-s-triazine
2,4-(diisopropoxy)-6-diethanolamino-s-triazine
2,4-di-t-butoxy-6-(N-ethylethanolamino)-s-triazine
2,4-dicyclohexyloxy-6-(N-methylbutanolamino)-s-triazine
2,4-diallyloxy-6-(N-ethylethanolamino)-s-triazine
2,4-bis(2-methacryloxyethoxy)-6-(N-methylethanolamino)-s-triazine
2,4-bis(N-propylethanolamino)-6-methoxy-s-triazine
2,4-bis(diisopropanolamino)-6-ethoxy-s-triazine
2,4-bis(diethanolamino)-6-isopropoxy-s-triazine
2,4-bis(diethanolamino)-6-t-butoxy-s-triazine
2,4-bis(diethanolamino)-6-cyclohexyloxy-s-triazine
2,4-bis(diethanolamino)-6-allyloxy-s-triazine
2,4-bis(diethanolamino)-6-(2-oxyethylmethacrylyl)-s-triazine
2,4-di(aziridyl)-6-(N-methylethanolamino)-s-triazine
2,4-di(pyrrolidyl)-6-(N-methylethanolamino)-s-triazine
2,4-di(piperidyl)-6-(N-methylethanolamino)-s-triazine As mentioned above, the process of the present invention is carried out in the presence of an acid acceptor which may be an organic or inorganic compound such as a tertiary amine or an oxide, a hydroxide, a carbonate or a bicarbonate of an alkali or alkaline earth metal. Illustrative compounds include lithium oxide, sodium oxide, potassium oxide, rubidium oxide, cesium oxide, magnesium oxide, calcium oxide, barium oxide, lithium hydroxide, sodium hydroxide, potassium hydroxide, cesium hydroxide, magnesium hydroxide, calcium hydroxide, lithium carbonate, sodium carbonate, potassium carbonate, magnesium carbonate, calcium carbonate, strontium carbonate, lithium bicarbonate, sodium bicarbonate, potassium bicarbonate, rubidium bicarbonate, cesium bicarbonate and the like. Examples of tertiary amines include triethylamine and tri-n-butylamine. The preferred acid acceptors are sodium and potassium hydroxides, carbonates and bicarbonates.

An amount of acid acceptor equivalent to the number of moles of hydrochloric acid generated by the reaction will generally be employed in the subject process.

The present process is distinct from heretofore known processes in that the intermediate monochloro- or dichloro-containing compound is not isolated and purified before being reacted with an alkanolamine. Because the prior art has always taught this separation, the yields of final product have been low. By discovering that the reaction can proceed directly without the separation, the yields of final product are substantially increased.

More specifically, the preferred process of the present invention comprises reacting one mole of cyanuric chloride with two moles of active hydrogen-containing compound first at a temperature of from about 0°C. to 30°C. for about 1 to 5 hours, and then at a temperature ranging from about 20°C. to 100°C. for about 2 to 5 hours, and thereafter reacting one mole of an alkanolamine therewith at a tmeperature of from about 60°C. to 150°C. for about 4 to 10 hours.

As is known to those skilled in the art, each of the three chlorine atoms of cyanuric chloride has a different level of reactivity, thus dictating the three different reaction stages. Therefore, although the method set forth above is preferred it is apparent that the addition of reactants could be reversed.

In practicing the present method, it is preferred to employ an aqueous slurry of cyanuric chloride. Generally, the slurry consists essentially of from about five to fifty percent by weight of cyanuric chloride, based on the total weight of the slurry. Although water is the preferred reaction medium, it is possible to carry out the reaction in a non-aqueous reaction medium. Representative media include aliphatic alcohols having from 1 to 12 carbon atoms such as ethanol, isopropanol, n-butanol, t-butanol, pentanol, hexanol, decanol, dodecanol, allyl alcohol, tetrahydrofuran, dioxane, or any other solvent in which the reactants are sufficiently soluble and which have sufficiently high boiling points. Solvents such as benzene, toluene, xylene, chloroform, acetonitrile, nitrobenzene, ethylene glycol dimethylether, or solvent-water combinations such as acetone-water or chloroform-water may be employed.

After the reaction has been completed, the resulting triazine is recovered by any conventional technique. By practicing the present process it has been found that yields of triazine are substantially increased in comparison to prior art methods.

For a more complete understanding of the present invention, following are specific non-limiting examples thereof. In the examples, all parts are by weight absent contrary notation.

EXAMPLE I

A reaction vessel equipped with a reflux condenser, thermometer, addition funnel, and mechanical stirrer was charged with 1380 parts of water and cooled to 0°C. Cyanuric chloride (922.5 parts) was then added portionwise maintaining the temperature of the reaction mixture below 5°C. Ten moles of anhydrous diethylamine was then added over 3 hours to the reaction mixture maintaining the temperature between 0°-5°C. Upon completion of the addition of the amine, a 50% aqueous sodium hydroxide solution (400 parts of NaOH in 400 parts of water) was added to the charge over a period of 1.5 hours while the temperature rose to 50°C. After the addition was completed, the reaction mixture was maintained at 50°C. for 1 hour. N-methylethanolamine (393.8 parts) was then slowly added to the charge over a period of thirty minutes and the charge was heated to reflux temperature, about 110°C. After reaching reflux, 400 parts of a 50% aqueous solution of sodium hydroxide was added dropwise to the vessel over a period of about 20 minutes to neutralize the generated hydrochloric acid. The contents in the vessel were then refluxed for four hours, after which time the reaction mixture was allowed to cool to room temperature. Thereafter, the organic layer was separated from the aqueous layer and was distilled to yield 1420.2 parts (96% of theory) of 2,4-bis(diethylamino)-6-(N-methyl-2-hydroxyethylamino)-s-triazine, a liquid product having a boiling point of 154°C. at 0.45 mm. of mercury.

EXAMPLE II

The procedure of Example I was duplicated with the single exception that solid sodium carbonate was employed in lieu of the 50% aqueous sodium hydroxide. A yield of 95% of theory of 2,4-bis(diethylamino)-6-(N-methylethanolamino)-s-triazine was obtained.

EXAMPLE III

A reaction vessel equipped as described in Example I was charged with 750 parts of water and cooled to 0°C. Cyanuric cloride (369 parts) was then added portionwise maintaining the temperature of the reaction mixture below 5°C. A 61.5% aqueous solution of dimethylamine (292.7 parts) was then slowly added to the reaction mixture over a period of 2 hours maintaining the temperature between 0°-5°C. Upon completion of the addition of the amine, a 50% aqueous sodium hydroxide solution (160 parts of NaOH in 160 parts of water) was added to the charge over a period of 1 hour while maintaining the temperature at 50°C. After the addition was completed, the reaction mixture was maintained at 50°C. for 1 hour. The charge was heated to reflux temperature, about 105°C., and 157.5 parts of N-methylethanolamine was added to the charge over a period of 30 minutes. After reaching reflux, 80 parts of a 50% aqueous solution of sodium hydroxide was added dropwise to the vessel over a period of about 20 minutes to neutralize the generated hydrochloric acid. The contents in the vessel were then refluxed for 17 hours, after which time the reaction mixture was allowed to cool to room temperature. The crystalline solid formed was collected by filtration, pulverized, washed with water and air dried. The yield of 2,4-bis(dimethylamino)-6-(N-methylethanolamino)-s-triazine was 419.5 parts (87.4% of theory) m.p. 104°-106°C.

EXAMPLE IV

The method described in Example III was repeated with 500 ml. of water, one mole of cyanuric chloride, 2 moles of dimethylamine and 1 mole of N-methylethanolamine. Instead of sodium hydroxide, 2 moles of sodium bicarbonate solid was used as acid acceptor in the first step. In the second step, 1 mole of 50% aqueous NaOH was used. The yield of 2,4-bix(dimethylamino)-6-(N-methylethanolamino)-s-triazine was 92% of theory.

EXAMPLE V

A reaction vessel equipped with a reflux condenser, thermometer, addition funnel, and mechanical stirrer was charged with 800 parts of dioxane, 184.5 parts of cyanuric chloride and 415.0 parts of finely powdered potassium carbonate. Two moles (146.0 parts) of diethylamine was then added dropwise to the reaction mixture over a period of 2 hours while the temperature was allowed to reach a maximun of 50°C. After the addition was completed, the reaction mixture was maintained at 50°C. for 1 hour. The mixture was then heated to 100°C. and 1 mole (75.0 parts) of N-methylethanolamine was then added dropwise over a period of 1 hours. After reaching reflux, the contents in the vessel were then refluxed for four hours, after which time the reaction mixture was allowed to cool to room temperature. Thereafter, the precipitated potassium chloride was removed by filtration. The filtrate was concentrated and fractionated to yield 208.5 parts of 2,4-bis(diethylamino)-6-(N-methylethanolamino)-1,3,5-triazine, a liquid product having a boiling point of 153°C. at 0.45 mm. of mercury.

EXAMPLE VI

A reaction vessel equipped as described in Example I was charged with 460 parts of absolute ethanol. Cyanuric chloride (92.2 parts) was then added portionwise over a period of thirty minutes maintaining the temperature of the reaction mixture between 25°–30°C. Upon completion of the addition, 168 parts of sodium bicarbonate was added to the charge over a period of 1 hour. After the addition of the sodium bicarbonate was completed, the reaction mixture was heated to reflux temperature, about 105°C., and maintained at this temperature for 1 hour. At this time, 57.8 parts (0.55 mole) of di-2-hydroxyethylamine was added to the charge over a period of 30 minutes. The contents of the vessel were heated at reflux (80°C.) for 4 hours, after which time the reaction mixture was filtered out to separate the inorganic material. The filtrate was concentrated to yield 124 parts (91%) of low melting solid 2,4-diethoxy-6-(di-2-hydroxyethylamino)-s-triazine.

EXAMPLE VII

A reaction vessel equipped as described in Example I was charged with 140 parts (1.66 moles) of sodium bicarbonate in 460 parts of ethanol. Cyanuric chloride (96.2 parts) was then added portionwise maintaining the temperature of the reaction mixture between 20°–25°C. After the addition was completed, the reaction mixture was gradually, over a period of 2 hours, brought to reflux temperature and maintained there for 2 hours. Thereafter, 41.3 parts (0.55 mole) of N-methylethanolamine was added to the charge over a period of 40 minutes. The contents in the vessel were then refluxed at 80°C. for 6 hours, after which time the reaction mixture was filtered hot to remove the inorganic material. The filtrate was concentrated and dried to yield a white crystalline solid. Analysis indicated a yield of 93 parts of 2,4-diethoxy-6-(N-methylethanolamino)-s-triazine, m.p. 106°–108°C.

The embodiments of the invention in which an exclusive property or privilege is claimed are defined as follows:

1. A process for the preparation of unsymmetrically-substituted alkanolamino-s-triazines of the formula:

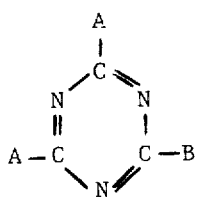

wherein
B is

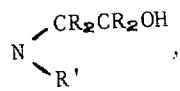

R is hydrogen or lower alkyl,
R' is $CR_2CR_2OH$ or lower alkyl and
A is $NR_2$,

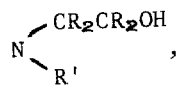

$C_1$–$C_{12}$ alkoxy, phenoxy, aziridyl, pyrrolidyl or piperidyl with the proviso that both A's cannot be B, which comprises reacting cyanuric chloride with a reactive hydrogen-containing compound having the formula: A–H wherein A is as described above in the presence of an acid acceptor to obtain a mono- or dichloro-containing intermediate and further reacting said intermediate without isolation or purification with an alkanolamine in the presence of an acid acceptor the mole ratio of cyanuric chloride to reactive hydrogen-containing compound to alkanolamine being from 1:1:2 to 1:2:1, respectively.

2. The process of claim 1 wherein the reaction is initially carried out (a) at a temperature between 0° and 30°C. for about 1 hour to 5 hours; (b) at a temperature betwen 20° and 100°C. for about 2 hours to 5 hours; and (c) at a temperature between 60° and 150°C. for about 4 hours to 10 hours.

3. The process of claim 1 wherein the acid acceptor is an alkali or alkaline earth metal salt.

4. The process of claim 1 carried out in an aqueous medium.

5. The process of claim 1 wherein the reactive hydrogen-containing compound is a primary or secondary alkyl amine having from 1 to 12 carbon atoms.

6. The process of claim 5 wherein the amine is dimethylamine or diethylamine.

7. The process of claim 1 wherein the alkanolamine is N-methylethanolamine.

8. A process for the preparation of unsymmetrically-substituted alkanolamino-s-triazines of the formula:

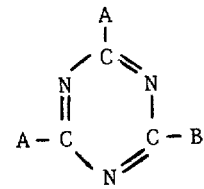

wherein
B is

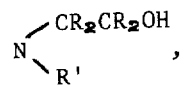

R is hydrogen or lower alkyl,
R' is $CR_2CR_2OH$ or lower alkyl, and
A is $NR_2$ or

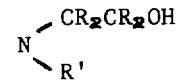

with the proviso that both A's cannot be B, which comprises sequentially reacting (a) an aqueous slurry of cyanuric chloride with (b) a primary or secondary alkyl amine having from 1 to 12 carbon atoms in a mole ratio of cyanuric chloride to amine of from 1:1 to 1:2, respectively, at a temperature between 0° and 50°C. for about 2 to 10 hours in the presence of an acid acceptor to obtain a chlorotriazine precursor which without isolation or purification is then reacted in the presence of an acid acceptor with (c) an alkanolamine in a mole ration of said precursor to alkanolamine of from 1:1 to 1:2 at a temperature between 60° and 150°C. for about 4 hours to 10 hours.

9. A process for the preparation of unsymmetrically-substituted alkanolamino-s-triazines of the formula:

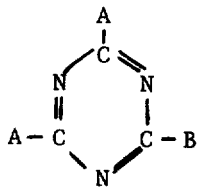

wherein
B is

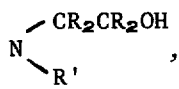

R is hydrogen or lower alkyl,
R' is $CR_2CR_2OH$ or lower alkyl and
A is $NR_2$,

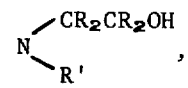

$C_1$–$C_{12}$ alkoxy, phenoxy, aziridyl, pyrrolidyl or piperidyl with the proviso that both A's cannot be B, which comprises reacting cyanuric chloride with an alkanolamine in the presence of an acid acceptor to obtain a mono- or dichloro-containing intermediate and further reacting said intermediate without isolation or purification with a reactive hydrogen-containing compound having the formula: A–H wherein A is as described above in the presence of an acid acceptor the mole ratio of cyanuric chloride to reactive hydrogen-containing compound to alkanolamine being from 1:1:2 to 1:2:1, respectively.

10. The process of claim 9 carried out in an aqueous medium.

* * * * *